United States Patent [19]

Garcea et al.

[11] 3,982,512
[45] Sept. 28, 1976

[54] DEVICE FOR AUTOMATICALLY ADJUSTING THE SPARK TIMING IN AN ELECTRONIC IGNITION SYSTEM FOR AN EXPLOSION ENGINE

[75] Inventors: Giampaolo Garcea; Filippo Surace; Edgardo Rogora, all of Milan, Italy

[73] Assignee: Alfa Romeo S.p.A., Milan, Italy

[22] Filed: Aug. 8, 1973

[21] Appl. No.: 386,744

[30] Foreign Application Priority Data
Aug. 16, 1972  Italy.................................. 28235/72

[52] U.S. Cl..................... 123/117 R; 123/146.5 A; 123/148 E
[51] Int. Cl.² .......................... F02P 5/04; F02P 1/00
[58] Field of Search................ 123/117, 119 R, 102, 123/148 E, 146.5 A

[56] References Cited
UNITED STATES PATENTS

| | | | |
|---|---|---|---|
| 3,454,871 | 7/1969 | Nolting............................ | 123/148 E |
| 3,592,178 | 7/1971 | Schiff............................... | 123/117 R |
| 3,718,123 | 2/1973 | Eckert et al..................... | 123/32 EA |
| 3,718,126 | 2/1973 | Oisai et al........................ | 123/117 R |
| 3,738,339 | 6/1973 | Huntzinger et al............. | 123/117 A |
| 3,749,073 | 7/1973 | Asplund........................... | 123/117 R |
| 3,752,139 | 8/1973 | Asplund........................... | 123/117 R |
| 3,757,755 | 9/1973 | Carner............................. | 123/117 R |
| 3,785,356 | 1/1974 | Niemoeller...................... | 123/117 A |
| 3,811,420 | 5/1974 | Vogel............................... | 123/117 R |
| 3,815,560 | 6/1974 | Wahl et al........................ | 123/117 R |
| 3,853,103 | 12/1974 | Wahl et al........................ | 123/117 R |

Primary Examiner—Charles J. Myhre
Assistant Examiner—Paul Devinsky
Attorney, Agent, or Firm—Haseltine, Lake & Waters

[57] ABSTRACT

In an electronic system for an explosion engine, a device for automatically adjusting the spark timing, wherein a follower is kept into contact with a three-dimensional cam having a surface shaped; with lifts representing the desired timing angle of the spark delivery with respect to an angular position of the drive shaft, said follower and said cam being mutually displaced in two directions orthogonal to each other and to the cam lifts as a function of variables representative of the engine operation, more particularly the engine r.p.m., the throttle angle and the suction pressure in the intake duct, and an electronic system comprising a transducer coupled to said follower to generate a first electric signal representative of the follower position, means generating a second electric signal representative of the time necessary for the rotation of the engine through a predetermined angle, means for processing said first and second signals to originate a third electric signal representative of the lag time corresponding to the desired timing angle measured by the follower, a timer operated upon the engine passing through the aforesaid predetermined angular position, so as to generate a fourth electric signal, and means for comparing said third and fourth signal as well as means controlling the spark delivery, thereby the latter takes place upon said third and fourth signals being equal.

12 Claims, 2 Drawing Figures

DEVICE FOR AUTOMATICALLY ADJUSTING THE SPARK TIMING IN AN ELECTRONIC IGNITION SYSTEM FOR AN EXPLOSION ENGINE

This invention relates to a device for automatically adjusting the spark timing in an electronic ignition system for an explosion engine.

The timing angle of an explosion engine normally signifies the lead angle with respect to the upper dead point of a piston at which the ignition spark is delivered. Alternatively the timing angle can also signify a lag angle with respect to a predetermined angular position of the drive shaft which is anticipated by a fixed angle with respect to the position corresponding to the upper dead point of the piston; in the case of an electronic ignition system using a distributor of normal type, this predetermined angular position may for example be the position in which the contacts of the contact breaker of said distributor open.

In the most advanced motor vehicles it is notably becoming increasingly desirable to provide automatic adjustment of the timing, which enables this latter to be continuously adapted to the various operating conditions of the engine.

For this reason certain devices have been evolved which automatically adjust the timing angle of the spark as a function of two variables representative of the operating condition of the engine, one of which is the speed of rotation of the engine and the other, at choice, may be the throttle angle or the suction in the engine intake pipe.

In particular certain devices are known, applicable in the case of mechanical ignition, in which separate sensing means, one of centrifugal type and the other of pneumatic type, measure the speed of rotation of the engine ($n$) and the suction in the engine intake pipe ($p$) and according to the values measured they act separately on the setting angle between the contact breaker and crankshaft in such a manner as to fix it each time at a value $\alpha = \alpha_0 + f_1(n) + f_2(p)$, where $\alpha_0$ is the initial setting angle.

From the above relationship it can be seen that the main disadvantage of these devices consists in the fact that because of the separate action exerted by the two sensing means on the setting angle it is impossible to obtain the determined value of $\alpha$ required for optimising the engine operation at every point of the field of use (characterised by a pair of $n$, $p$ values). This would however be possible if a device was available which satisfied the relationship $\alpha = \alpha_0 + f(n, p)$, i.e., a device able to determine the required setting angle for each combination of values of $n$ and $p$.

To satisfy this requirement, certain devices have recently been involved, again for use in combination with traditional mechanical ignition, which are based on the presence of a spacial cam made to traverse along its own longitudinal axis and rotate about it as a function of the speed of rotation of the engine and of the throttle angle or suction in the engine intake pipe, and has a contact surface shaped in such a manner that the distance of each of its points from said axis represents the optimum desired value for the aforementioned function $f(n, p)$, and hence for the timing angle, for each individual operating condition of the engine (that function of n and p which enables the operation of the engine to be optimised is hence memorised on the contact surface of the spacial cam). An axially movable follower is kept engaged with the contact surface of the spacial cam, and the axial position which it assumes in turn represents therefore the required information relative to the optimum timing angle for each individual operating condition of the engine. This information is then evidently utilised so as to consequently adjust the setting angle between the contact breaker and crankshaft.

The success of these latter devices has naturally led to a consideration of the possibility of utilising its basic principles for obtaining an equally well operating device which is suitable for use in an electronic ignition system. It is evident that the direct application of the device provided for mechanical ignition is made impossible by the fact that, whereas in mechanical ignition the final result of the timing operation is represented by a change in the setting angle between the contact breaker and crankshaft, i.e. the variation of a quantity dimensionally analogous to that imposed on the spacial cam, in electronic ignition the final result is represented by a change in the lag time of the spark delivery with respect to a predetermined moment corresponding to the passage of the drive shaft from a precise predetermined angular position, e.g. that which causes the contacts of the contact breaker to open. In the case of electronic ignition the dimensional analogy is therefore missing between the final result and cam setting, which is indispensable for the direct utilisation of the system incorporating a spacial cam and follower. On the other hand neither can the spacial cam be set in such a manner that its contact surface directly gives the lag times corresponding to the required timing angles, as a cam of this type would be difficult to construct because of the high ratio between the minimum lag time (maximum lead) and maximum lag time (minimum lead), a ratio which is of the same order as the ratio of the maximum to minimum speeds of the engine. In particular a very large cam would have to be constructed in order to reduce the errors of inaccuracy and to give slopes acceptable to the contact surface. The assembly would be complicated in that account would preferably have to be taken of the fact that the field of operation of the engine can in practice be divided into three zones (urban use with fairly modest delivered powers, extra urban use with intermediate powers, and use on motor ways or on steep upward slopes with maximum powers), with each of which must correspond a different function $f(n, p)$.

To resolve this problem it was therefore decided to provide a device for automatically adjusting the spark timing in an electronic ignition system which, by the provision of adequate means able to convert the timing angles imposed on the cam into corresponding spark delivery lag times, is able to use a system comprising a spacial cam and follower, in which the contact surface of the cam is shaped in such a manner as to reproduce the desired timing angles for the various operating conditions of the engine (so that a relatively simple and small spacial cam can be used such as those at present in use in timing devices for mechanical ignition systems).

For this object the device according to the invention has been provided, comprising a spacial cam with a contact surface shaped so that its lifts represent the desired timing angle, defined as the angle of lag of the spark delivery with respect to a predetermined angular position of the drive shaft, for each single operating condition of the engine, a follower kept in engagement with said contact surface of the spacial cam so that its position is representative of the desired timing angle for each particular operating condition of the engine, relative movements between the cam and follower being provoked in two directions orthogonal to each other and orthogonal to the cam lifts as a function of the speed of rotation of the engine and of one of a further two variables representative of the operating condition of the engine consisting of the throttle angle and the suction in the engine intake pipe, and further comprising a transducer associated with said follower so as to produce a first electrical signal of a value variable with the position of the follower, means for measuring the time necessary for the engine to rotate through a predetermined angle at each complete cycle of a cylinder of the engine, means for converting said time measurement into a second electrical signal, means for processing said first and second electrical signals to obtain a third electrical signal representative of the lag time corresponding to the desired timing angle measured by the follower, a timer operated at the moment of passage of the engine from said predetermined angular position so as to produce a fourth electrical signal of a value which increases with time, means for comparing said third and fourth signals and means for controlling the delivery of the spark which is sensitive to the attainment by said fourth signal of the value of said third signal.

It is evident that a device of this kind completely attains the object of adapting to electronic ignition the useful and advantageous system of the spacial cam with timing angles memorised on its contact surface, as used up to the present time for mechanical ignition. The conversion from timing angle to desired lag time is evidently ensured by the processing of the first electrical signal which is a function of the timing angle and the second electrical signal which is a function of a sample reference time, whereas the determination of the moment of delivery of the spark is ensured by the comparison made between the third electrical signal which is a function of the desired lag time and the fourth electrical signal which is a function of the time which has passed from the moment in which the drive shaft passed by the predetermined angular position, with respect to which the desired timing angle has been calculated (for example represented by the angular position which determines the opening of the contacts of the contact breaker). As can be seen, this is a simple device of reliable operation which is perfectly able to satisfy all the requirements for optimising the operation of the engine.

The characteristics and advantages of the present invention will be more evident from the following detailed description of one of its embodiments shown in the accompanying drawings, in which.

Figure 1:
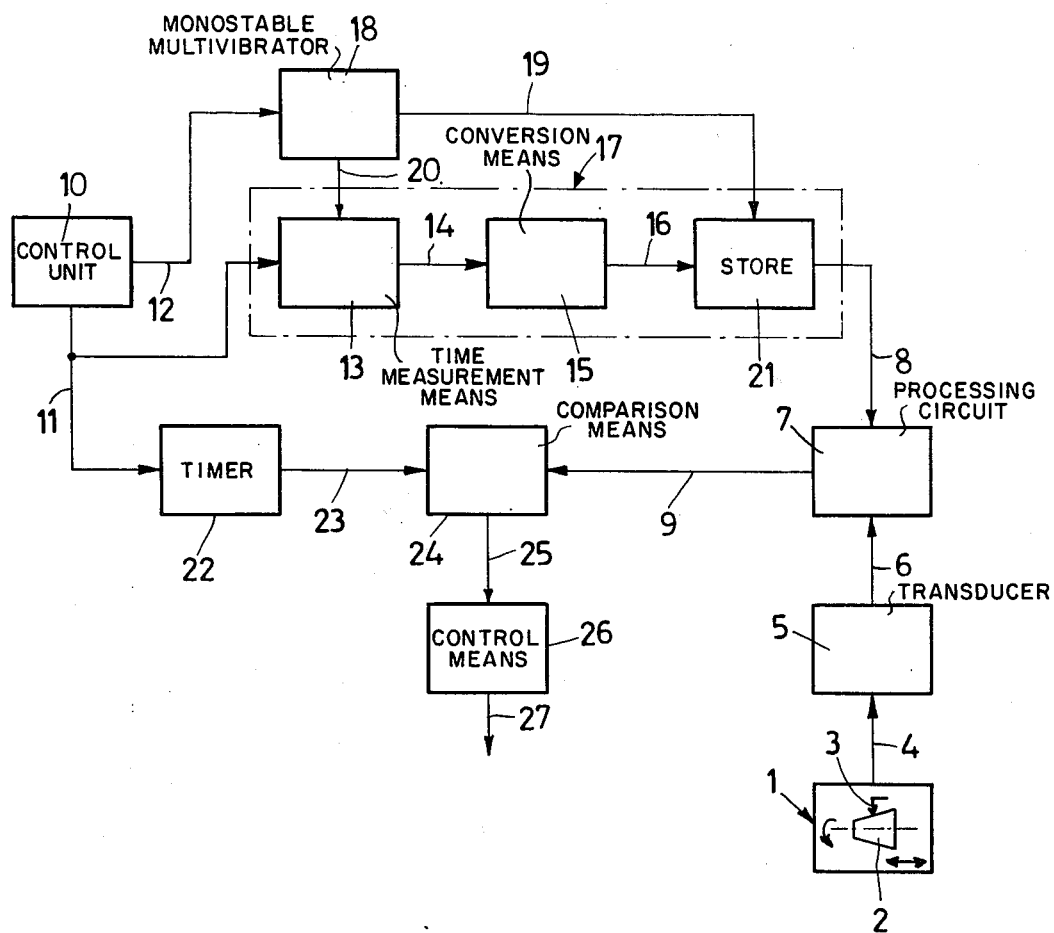
FIG. 1 is the general block diagram of a device according to the invention.

The device shown in FIG. 1 comprises firstly an assembly 1 for determining the desired timing angle for each individual operating condition of the motor, which consists of a spacial cam 2 (e.g. of the type disclosed in the U.S. Pat. No. 3,640,259) and a follower 3 maintained in mutual engagement. The spacial cam 2 is connected to the engine so that it is made to traverse along its own longitudinal axis and to rotate about it as a function respectively of the speed of rotation of the engine and of the throttle angle (or of the suction in the engine intake pipe), and has a contact surface shaped in such a manner that the distance of each of its points from said axis represents the desired timing angle (defined as the angle of lag of the spark delivery with respect to a predetermined angular position of the drive shaft, for example with respect to an angular position anticipated by a fixed angle with respect to the position corresponding to the upper dead point of the piston associated with the cylinder concerned in the spark delivery) for each single operating condition of the motor. The follower 3 is in its turn coupled to the contact surface of the spacial cam so that it moves axially as the point of the cam with which it is engaged varies, so that its axial position constitutes a mechanical signal 4 representative of the desired timing angle ($\alpha r$) for each single operating condition of the engine.

At the outlet of the cam-follower assembly 1 there is a mechanical-electrical transducer 5, the object of which is to transform the mechanical signal 4 into an electrical signal 6, which is fed to one of the two inlets of a processing circuit 7 where together with a further electrical inlet signal 8 representative of the time necessary for the engine to rotate through a predetermined angle on each complete cycle of a cylinder of the engine produces an electrical outlet signal 8 representative of the lag time ($t_r$) corresponding to the desired timing angle ($\alpha_r$) determined by the assembly 1.

The electrical signal 8, which evidently constitutes the necessary time reference for transforming the timing angle into a corresponding time lag, is produced by a whole group of elements, the starting element of which consists of a control unit 10 which is coupled to the engine so as to produce two electrical signals 11 and 12. As the drive shaft passes through two different predetermined angular positions, the first of which coincides with the aforementioned predetermined angular position with respect to which the timing angle is calculated and the second anticipates the first by a predetermined angle $\alpha_c$, the signal 11 which is of the rectangular wave type presents a discontinuity, and the signal 12 which is of the impulse type presents a positive and negative impulse. For example the control unit 10 could comprise magnetic or light source means, possibly provided with rotating intercepting means, associated with magnetic resistance switches or photodiodes and phototransistors, or could comprise a normal lobe cam-contact breaker assembly designed and arranged so that each closure of the contact breaker contacts coincides with the upper dead point of a piston and makes the signal 11 pass to the minimum continuous voltage level and produces a negative impulse in the signal 12, and each opening coincides with the predetermined angular position with respect to which the timing angle is calculated and makes the signal 11 pass to the maximum continuous voltage level. In this case the angle $\alpha_c$, which as will be more evident hereinafter constitutes the sample angle the attainment time for which represents the sample time $t_c$ which forms the time reference for transforming the timing angle $\alpha_r$ into a corresponding lag time $t_r$, would evidently be equal to the angular distance (i.e. dwell angle) between the closure and opening of the contact breaker contacts, which in the case of a four stroke four cylinder engine would be 60°. The signal 12 is fed to the monostable multivibrator 18, the signal 11 is fed to the time measurement means 13 to activate and deactivate its operation; the outlet signal 14 is consequently a function of the time for which the contact breaker contacts remain closed, i.e. the time for which the signal 11 remains at its minimum value, which represents the sample time $t_c$. The time signal 14 is fed to conversion means 15, which transform it into an electrical signal 16 which has a voltage or current value which is in its turn a function of the time $t_c$, and this latter is stored in a store 21 from which it can be withdrawn as a signal 8. The three blocks 13, 15 and 21 therefore form a complex 17 for determining and storing a time reference signal 8, to which is coupled the monostable multivibrator 18 which feeds the signal 20 to the time measuring means 13 and, when supplied by the negative impulse of the signal 12, firstly changes over to a quasi-stable state in which it emits a signal 19 for erasing the store 21 and by way of the signal 20 feeds information for momentarily blocking the time measuring means 13, and then returns to a stable state in which said signal 19 is cancelled and the signal 20 together with the signal 11 enables the elements 13 and 21 to form the reference signal 8.

The signal 11 is also fed to the inlet of a timer 22 which, when the signal 11 presents its maximum voltage level, emits an electrical signal 23 of a value which increases with time, which is continually compared with the signal 9, representative of the lag time $t_r$ corresponding to the timing angle $\alpha_r$ fixed by the camfollower assembly 1, in comparison means 24 arranged to emit a signal 25 when the value of the signal 23 reaches that of the signal 9. Control means 26, sensitive to the signal 25, which evidently contains information regarding the attainment of a time lag equal to that $(t_r)$ fixed by the signal 9, and when this happens they emit a signal 27 for controlling the delivery of the spark.

The operation of the device shown in FIG. 1 is as follows. The delivery of a signal 12 by the control unit 10 (for example on closure of the contact breaker contacts) causes the momentary switching over of the monostable multivibrator 18 to a quasi-stable state, in which the signals 20 and 19 cause on the one hand the momentary blockage of the time measurement means 13 and on the other hand the erasing of the store 21. As soon as the monostable multivibrator returns to its stable state the accompanying action of the signals 11 and 20 is such as to activate the measuring means 13 which emit a signal 14 of duration equal to the time of activation of the measuring means 13, i.e. equal, without the time constant of the multivibrator 18, to the time during one period for which the signal 11 remains at its minimum value (e.g. equal to the time distance between the closing and opening of the contact breaker contacts). The time signal 14 is transformed into a signal 16 of a value depending on said time duration, which is stored in the store 21. The signal 8 available at the outlet of the store 21 will hence be a function of the time for which the signal 11 remains at its minimum value, i.e. a sample time $t_c$. The processing in the circuit 7 of the signal 8 which is a function of $t_c$ and the signal 6 which is a function of the desired timing angle $\alpha_r$ determined by the assembly 1 gives rise to a signal 9 which is a function of the lag time $t_r$ corresponding to $\alpha_r$. This lag time $t_r$ is referred to the predetermined angular position to which the switching over to the maximum voltage level of the signal 11 corresponds (e.g. that of the opening of the contact breaker contacts), so that when the signal 23, having a value which increases in time starting from the moment of switching over to the maximum level of the signal 11, reaches the value of the signal 9, this signifies that a lag time has been effectively reached which is equal to that $(t_r)$ desired for suitable timing of the spark. As it is at this point that the control means 26 deliver a control signal 27 for the delivery of the spark, this latter is certain to strike precisely at the desired moment.

Figure 2:
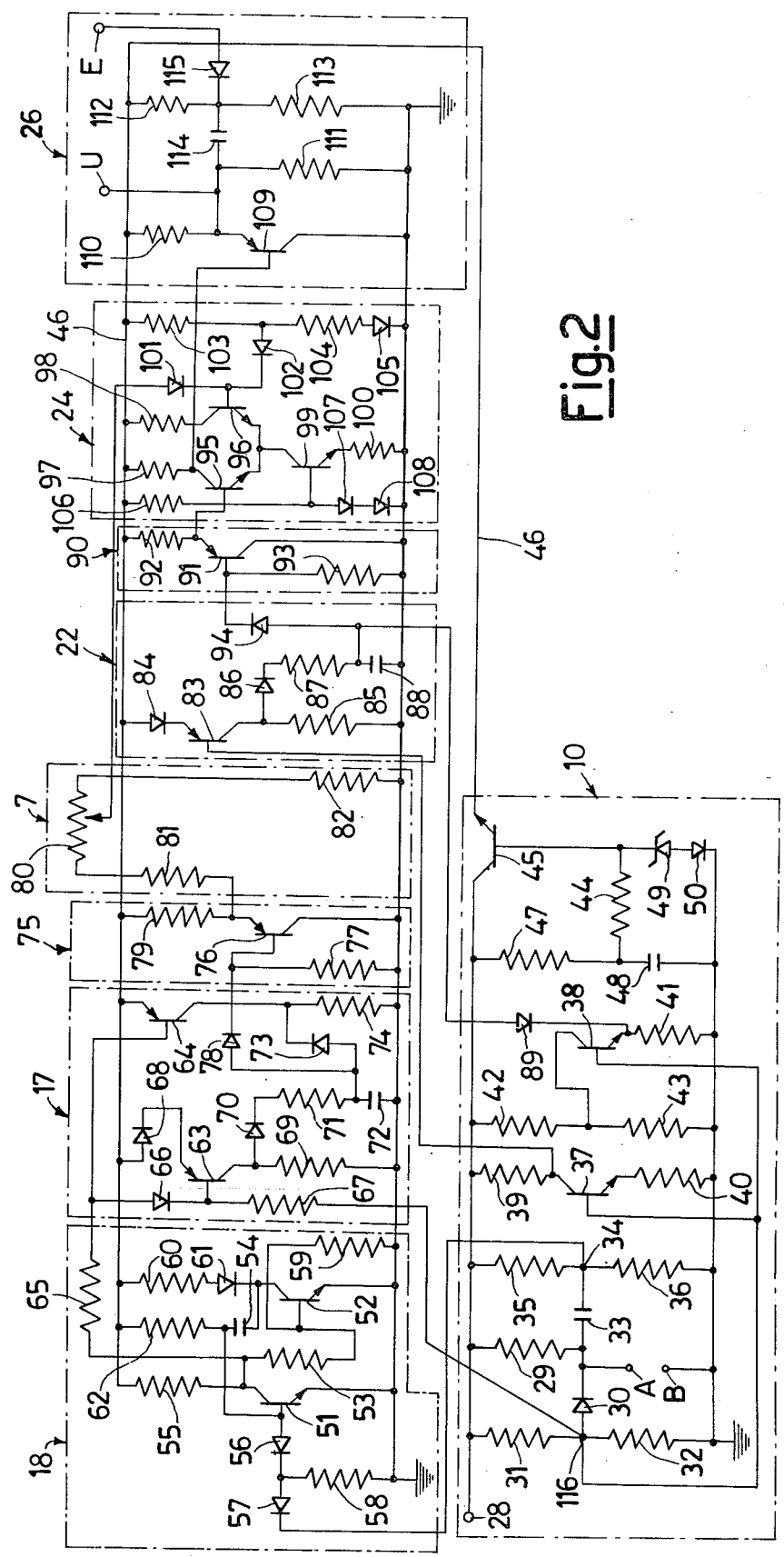
FIG. 2 is an example of a detailed circuit diagram of a device according to the invention.

The method of operating the device shown in FIG. 1, which is in itself very clear, will be more evident if the detailed example of a circuit diagram shown in FIG. 2 is considered. In this figure the control unit 10 has been provided with an inlet represented by two contacts A and B closed and opened by the contact breaker of the distributor. The contact B is connected to earth whereas the contact A is connected to a positive supply terminal 28 by way of a resistance 29. The contact A is also connected to the cathode of a diode 30, the anode of which is connected to the terminal 28 by way of a resistance 31 and to earth by way of a resistance 32. The contact A is also connected by way of a condenser 33 to an intermediate node 34 between two resistances 35 and 36 connected in series between the terminal 28 and earth. To the anode of the diode 30 are connected the bases of two NPN transistors 37 and 38 (which form part of a control prestage of the timer 22), of which the first has its collector connected to the terminal 28 by way of a resistance 39 and its emitter connected to earth by way of a resistance 40, and the second has its emitter connected to earth by way of a resistance 41 and its collector connected to an intermediate node between two resistances 42 and 43 connected in series between the terminal 28 and earth.

The control unit 10 also comprises a voltage stabiliser unit comprising an NPN transistor 45 with its collector connected to the supply terminal 28, and its emitter connected to a stabilised positive voltage outlet line 46, a resistance 47 and a condenser 48 connected in series between the terminal 28 and earth, a Zener diode 49 and a diode 50 connected in series between the base of the transistor 45 and earth, and finally a resistance 44 connected between the base of the transistor 45 and an intermediate point between the resistance 47 and condenser 48. The purpose of this stabilising unit is to provide on the line 46 a voltage which is stabilised at a constant value even if the terminal 28, as evidently can happen, becomes connected to the battery of the motor vehicle, i.e. to an inevitably variable voltage generator.

The monostable multivibrator 18 comprises two NPN transistors 51 and 52 connected together by means of a resistance 53 connected between the collector of the first and base of the second and a condenser 54 connected between the collector of the second and base of the first. The transistor 51 has also its emitter connected directly to earth, its collector connected to the positive stabilised line 46 by way of a resistance 55 and its base connected to the node 34 of the control unit 10 by way of two diodes 56 and 57 connected in series, the intermediate point of which is connected to earth by way of a resistance 58. The transistor 52 has its base connected to earth by way of a resistance 59, its emitter connected directly to earth and its collector connected to the line 46 by way of a resistance 60 and diode 61 connected in series and a resistance 62 and condenser 54 connected in series.

The complex 17 for determining and storing the time reference signal 8 comprises two PNP transistors 63 and 64, the first of which has its base connected to the collector of the transistor 51 of the monostable multivibrator 18 by way of a diode 66 and resistance 65 and the second has its base connected to the collector of the transistor 51 by way of the resistance 65. The transistor 63 has its base connected to the anode of the diode 30 of the control unit 10 by way of a resistance 67, its emitter connected to the line 46 by way of a diode 68 and its collector connected to earth by way of a resistance 69, and by way of a diode 70, a resistance 71 and condenser 72 connected in series, and further by the diode 70, resistance 71, a diode 73 and a resistance 74 connected in series. The transistor 64 has its emitter connected directly to the line 46 and its collector connected to earth by way of the resistance 74.

The complex 17 is followed by a current amplifier 75 comprising a PNP transistor 76 with its base connected to earth by way of a resistance 77 and by way of a diode 78 and a condenser 72 connected in series, its collector connected directly to earth and its emitter connected to the line 46 by way of a resistance 79.

The processing circuit 7 comprises a potentiometer 80 provided with a slider movable rigid with the follower 3 of the cam-follower assembly 1. This potentiometer is connected in series with two resistances 81 and 82 between the emitter of the transistor 76 and earth.

The timer 22 controlled by the aforementioned control prestage comprises a PNP transistor 83 with its emitter connected to the line 46 by way of a diode 84, its base connected directly to the collector of the transistor 37 of the control prestage and its collector connected to earth by way of a resistance 85 and by way of a diode 86, a resistance 87 and condenser 88 connected in series. The collector of the transistor 83 is further connected to the emitter of the transistor 38 of said prestage by the diode 86, the resistance 87 and another diode 89 connected in series.

The timer 22 is followed by a current amplifier 90, which comprises a PNP transistor 91 with its collector connected directly to earth, its emitter connected to the line 46 by way of a resistance 92 and its base connected to earth by way of a resistance 93 and by a diode 94 and the condenser 88 connected in series.

The current amplifier 90 is followed by the comparator circuit 24, made in the form of a differential amplifier. It comprises two NPN transistors 95 and 96 with their collectors connected to the line 46 by way of respective resistances 97 and 98 and their emitters connected together and to the collector of an NPN transistor 99 the emitter of which is connected to earth by way of a resistance 100. The base of the transistor 95 is connected directly to the emitter of the transistor 91 of the current amplifier 90, while the base of the transistor 96 is connected by way of a diode 101 to the slider of the potentiometer 80 and by way of a further diode 102 to an intermediate point between two resistances 103 and 104 connected in series together and with a diode 105 between the line 46 and earth. Finally the base of the transistor 99 is connected to the line 46 by way of a resistance 106 and to earth by way of two diodes 107 and 108 in series.

Finally the control circuit 26 for the delivery of the spark comprises a PNP transistor 109, the base of which is connected directly to the collector of the transistor 95 of the comparator circuit 24, its collector is connected directly to earth and its emitter is connected to the line 46 by way of a resistance 110. The control circuit 26 also comprises a first outlet U and a second outlet E connected to the emitter of the transistor 109, one directly and the other by way of a circuit formed from a resistance 111 connected between the emitter of the transistor 109 and earth, two further resistances 112 and 113 connected in series between the line 46 and earth, a condenser 114 connected between the emitter of the transistor 109 and an intermediate point between the resistances 112 and 113 and finally a diode 115 connected between the outlet E and said intermediate point. The inlet of the ignition device is intended to be connected to the outlet U or alternatively to the outlet E if a control of the impulsive type is required.

To understand the operation of the device shown in FIG. 2, it will be supposed that the initial condition corresponds to a time immediately preceding that of closure of the contacts A and B of the contact breaker. In this condition the transistors 37, 38, 51, 64, 83, 95, 99 and 109 are conducting (at the outlet U there is therefore available an ignition control in the form of a low continuous voltage and at the outlet E in the form of a negative voltage impulse), the transistors 52, 63 and 96 are locked, the condensers 33, 72 and 88 are still charged to the voltages fixed during the previous operating cycle of the device and the transistors 76 and 91 are kept in a condition of low conduction by the voltage across said condensers.

As soon as the contacts A and B of the contact breaker close, the potential of the node 116 is equal to earth potential, by which the transistors 37 and 38 lock, so that the first causes locking of the transistor 83 and consequent ceasing of the charge of the condenser 88 (the purpose of the diode 84 is to provide reliable locking control of the transistor 83), while the second causes the condenser 88 to discharge through the resistance 41 (the purpose of the diodes 86 and 89 is that of decoupling). When the condenser 88 is discharged, the transistor 91 works close to saturation (the purpose of the diode 94, of the same material as the transistor 91, is to compensate for any variations in the characteristics of this latter due to temperature variations or other analogous causes), so that the transistor 95 locks and the transistor 96 conducts, subjected to the polarising voltage obtained from the divider formed from the resistances 103 and 104 (the purpose of the diodes 101 and 102 is that of decoupling and the purpose of the diode 105, of the same material as the transistor 96, is that of compensation, whereas the purpose of the diodes 107 and 108 is to stabilise the constant current generator consisting of the transistor 99). When the transistor 95 locks, the transistor 109 also locks because of which at the outlet U there is now no ignition control signal as the voltage passes to a level greater than that which controlled the ignition. At the outlet E there is no positive impulse as this is prevented by the diode 115.

In addition to the aforementioned effects, which result in practice in the zeroing of the timer 22 and the return to rest of the control circuit 26, the closure of the contacts A and B also has the effect of causing the condenser 33 to discharge, because of which on the node 34 a negative voltage impulse forms which, arriving at the base of the transistor 51, momentarily locks the transistor 51 and hence causes the transistor to momentarily conduct for a time determined by the values of the resistance 62 and condenser 54. The monostable multivibrator 18 then switches over momentarily to a quasi-stable state, in which by way of the resistance 65 it locks the transistors 63 and 64 (the first in spite of the negative polarisation due to the connection to earth of the node 116 of the control unit 10).
The locking of the transistor 64 enables the condenser 72 to discharge through the resistance 74 (in practice the condenser 72 constitutes the store 21 of FIG. 1), with the result that the transistor 76 is put into an operating condition close to saturation (the purpose of the diodes 70 and 73 is that of decoupling and the purpose of the diode 78 is that of compensation with respect to the transistor 76).

As soon as the monostable multivibrator 18 returns to its stable state, the transistors 63 and 64 switch over to conduction (the negative polarisation given by the resistance 67 therefore acts on the first), by which the condenser 72 can begin to charge to a voltage dependent on the conduction time of the transistor 63 (this latter therefore acts as a time measurer 13, while the condenser 72 acts as conversion means 15 and storage means 21). The voltage $V_c$ established across the condenser 72, and which progressively increases with time, is carried substantially unaltered between the base of the transistor 76 (which conducts at a gradually decreasing level) and earth (the transistor 76 thus operates in practice as a repeater, simply ensuring a small current amplification), and then to the ends of the series circuit consisting of the resistances 81 and 82 and potentiometer 80. If the ohmic values of the resistances 81 and 82, the potentiometer 80 and that part of the potentiometer between the slider and the terminal connected to the resistance 82 are R81, R82, R80 and r80 respectively, then the voltage $V_r$ obtained across the slider of the potentiometer 80 and fed to the base of the transistor 96 is given by the relationship:

$$V_r = V_c \frac{r80+R82}{R80+R81+R82}$$

or, as r80 is a function of the desired timing angle $\alpha_r$ measured by the follower 3 for a particular position of the spacial cam 2 and as R80+R81+R82 is constant:

$$V_r = f(V_c \cdot \alpha_r)$$

The value of $V_c$, which increases with time, is finally fixed and stored in the condenser 72 at the moment of reopening of the contacts A and B of the contact breaker. This reopening causes the transistor 63 to return to the locked state with consequent ceasing of the charge of the condenser 72 and consequent storing of the charge itself by the maintaining in conduction of the transistor 64. The voltage $V_c$ in that moment across the condenser 72 will evidently be a function of the time of conduction of the transistor and hence, except for the vibrating time (constant) of the monostable multivibrator 18, a function of the time $t_c$ between the closure and opening of the contact breaker contacts. As $t_c$ is equal to $\alpha_c/N$, where $\alpha_c$ is the predetermined sample angle between the two angular positions which determine the closure and opening of the contact breaker contacts and N is the number of revolutions of the engine in a unit of time, then:

$$V_c = f(t_c) = f(\alpha_c)/(N) = f(1)/N$$

where $\alpha_c$ is constant.

The previously fixed relationship for $V_r$ therefore becomes:

$$V_r = f(\alpha_r)/N = f(t_r).$$

i.e. the voltage $V_r$ finally fixed on the base of the transistor 96 represents the lag time $t_r$ corresponding to the desired timing angle $\alpha_r$ determined by the cam-follower assembly 1.

In addition to the stated effects, the reopening of contacts A and B also has the effect of switching over the transistors 37 and 38 into the conducting state with the consequent conduction of the transistor 83 for recharging the condenser 88. The voltage which increases with time (and representative of the lag time which has gradually accumulated starting from the moment of opening of the contact breaker contacts) is carried virtually unaltered to the base of the transistor 95, the transistor 91 also acting in practice as a repeater and current amplifier. As soon as the voltage applied to the base of the transistor 95 reaches and exceeds the voltage $V_r$ applied to the base of the transistor 96, signifying that a lag time has been accumulated equal to the desired time $t_r$, the differential amplifier formed from the transistors 95 and 96 changes over, i.e. the transistor 95 conducts and the transistor 96 locks. The consequence of the conduction of transistor 95 is the conduction of the transistor 109 and hence the provision of a control signal at the outlet U. At the outlet E there will instead be present an impulse signal, which could be used if desired by connecting the inlet of the ignition device to it instead of to the outlet U. In each case it is evident that an ignition control signal is obtained which has exactly that time lag corresponding to the desired timing imposed by the cam-follower assembly.

What we claim is:

1. A device for automatically adjusting the spark timing in an electronic ignition system for an explosion engine, comprising a spacial cam with a contact surface shaped so that its lifts represent the desired timing angle, defined as the angle of lag of the spark delivery with respect to a predetermined angular position of the drive shaft indicative of the end of dwell angle, for each single operating condition of the engine, a follower kept in engagement with said contact surface of the spacial cam so that its position is representative of the desired timing angle for each particular operating condition of the engine, relative movements between the cam and follower being provoked in two directions orthogonal to each other and orthogonal to the cam lifts as a function of the speed of rotation of the engine and of one of a further two variables representative of the operating condition of the engine consisting of the throttle angle and the suction in the engine intake pipe, and further comprising a transducer associated with said follower so as to produce a first electrical signal of a value variable with the position of the follower, switch means for measuring the time necessary for the engine to rotate through a predetermined dwell angle at each complete cycle of a cylinder of the engine, means for converting said time measurement into a second electrical signal, means for processing said first and second electrical signals to obtain a third electrical signal representative of the lag time corresponding to the desired timing angle measured by the follower, a timer operated at the moment of passage of the engine from said predetermined angular position indicative of the end of dwell angle so as to produce a fourth electrical signal of a value which increases with time, means for comparing said third and fourth signals and means for controlling the delivery of the spark which is sensitive to the attainment by said fourth signal of the value of said third signal.

2. A device as claimed in claim 1, said electronic ignition system comprising a distributor contact breaker, in which said predetermined angular position coincides with that which determines the opening of the distributor contact breaker contacts.

3. A device as claimed in claim 2, in which said predetermined angle coincides with the angular distance between the position which determines the closure of the contact breaker contacts and that which determines their successive reopening.

4. A device as claimed in claim 1, in which said transducer consists of a potentiometer with a slider sensitive to the movements of the follower, said first electrical signal being constituted by the resistance of the potentiometer chosen by the slider, said second electrical signal being constituted by a voltage applied across the potentiometer and said third electrical signal being constituted by the voltage withdrawn by the slider.

5. A device as claimed in claim 1, in which said means for measuring time and said conversion means are controlled by a control unit coupled to the engine in such a manner as to emit a signal for activating said means for measuring time at the moment of passage of the engine through an angular position which leads said predetermined angular position by said predetermined angle, and a signal for deactivating said means for measuring time at the moment of successive passage of the drive shaft through said predetermined angular position.

6. A device as claimed in claim 5, in which said control unit is also coupled to said timer so as to control its activation and deactivation to coincide respectively with the deactivation and activation of said means for measuring time.

7. A device as claimed in claim 5, in which said control unit is controlled by the contact breaker of the distributor so as to emit said activation signal at the moment of closure of the contact breaker contacts and said deactivation signal at the moment of opening of the contact breaker contacts.

8. A device as claimed in claim 5, in which said conversion means are followed by a store and a monostable multivibrator is provided connected to said control unit, to said means for measuring time and to said store in such a manner that the activation signals emitted by said control unit cause its momentary switching over to a quasi-stable state in which it emits signals for the momentary blocking of said means for measuring time and signals for erasing said store.

9. A device as claimed in claim 8, in which said means for measuring time, said conversion means and said store are joined in a single complex comprising a first switch means made to close by said activation signals supplied by said control unit and made to open by said blocking signals supplied by said monostable multivibrator and by said deactivation signals supplied by said control unit, and a condenser provided with a charging circuit including said first switch means and a discharge circuit including second switch means made to switch over to a condition in which said discharge circuit is connected into the circuit by said erasing signals supplied by said monostable multivibrator, the voltage across said condenser at the moment of arrival of one of said deactivation signals constituting said second electrical signal.

10. A device as claimed in claim 6, in which said timer comprises a further condenser provided with a charging circuit including first switch means made to switch over respectively into a condition of closure and a condition of opening of the charging circuit by the activation and deactivation signals supplied by said control unit, and a discharge circuit including second switch means made to switch over respectively to a condition of disconnection and a condition of connection of the discharge circuit by activation and deactivation signals supplied by said control unit, the voltage across said further condenser constituting said fourth electrical signal.

11. A device as claimed in claim 1, in which said comparison means consist of a differential amplifier with a constant current generator, said differential amplifier being formed from a first and second transistor with a common emitter, to the bases of which are fed said third and fourth signals respectively.

12. A device as claimed in claim 11, in which said control means comprise switch means sensitive to the state of balance of said differential amplifier.

* * * * *